US007071401B2

(12) United States Patent
May

(10) Patent No.: US 7,071,401 B2

(45) Date of Patent: Jul. 4, 2006

(54) CARRIER ASSEMBLY FOR PERCUSSION INSTRUMENTS

(76) Inventor: Randall L. May, 2 Trafalgar, Newport Beach, CA (US) 92660

( * ) Notice: Subject to any disclaimer, the term of this patent is extended or adjusted under 35 U.S.C. 154(b) by 57 days.

(21) Appl. No.: 10/374,676

(22) Filed: Feb. 26, 2003

(65) Prior Publication Data

US 2003/0217636 A1 Nov. 27, 2003

Related U.S. Application Data

(63) Continuation-in-part of application No. 08/588,244, filed on Jan. 18, 1996, now Pat. No. 5,691,492, and a continuation-in-part of application No. 09/756,479, filed on Jan. 8, 2001, now Pat. No. 6,403,869, and a continuation-in-part of application No. 09/497,265, filed on Feb. 3, 2000, now Pat. No. 6,323,407, and a continuation-in-part of application No. 08/976,999, filed on Nov. 24, 1997, now Pat. No. 6,028,257, and a continuation-in-part of application No. 10/170,005, filed on Jun. 10, 2002, now Pat. No. 6,770,805.

(51) Int. Cl.
*G01D 13/02* (2006.01)

(52) U.S. Cl. ........................................................ 84/421

(58) Field of Classification Search .................. 84/421, 84/327, 329; D17/93; 248/443
See application file for complete search history.

(56) References Cited

U.S. PATENT DOCUMENTS 4,453,442 A * 6/1984 LaFlame ...................... 84/421
4,605,144 A * 8/1986 LaFlame ..................... 224/265
5,952,594 A * 9/1999 Chuang ....................... 84/413

* cited by examiner

*Primary Examiner*—Kimberly Lockett
(74) *Attorney, Agent, or Firm*—Neal J Mosely

(57) ABSTRACT

Apparatus is disclosed for carrying percussion instruments, particularly drums of various kinds, which comprises a combination of a carrier assembly with a novel receptacle for supporting J-rods thereon. The carrier is a vest-type or T-bar-type carrier with clamps for tubes or J-rods having a base and overlying portion configured to engage the tube or J-rod at a plurality of distinct and separate points. Variations are shown which have one or more clamps on a single base. In other embodiments, a plurality of clamps are adjustably positioned on the carrier.

27 Claims, 9 Drawing Sheets

CARRIER ASSEMBLY FOR PERCUSSION INSTRUMENTS

CROSS REFERENCE TO RELATED APPLICATION

This application is a continuation-in-part of applicant's applications Ser. No. 08/588,244, filed Jan. 18, 1996, now U.S. Pat. No. 5,691,492, issued Nov. 25, 1997 and Ser. No. 08/976,999 filed Nov. 24, 1997, now U.S. Pat. No. 6,028, 257 issued Feb. 22, 2000, Ser. No. 09/487,265, filed Feb. 3, 2000, now U.S. Pat. No. 6,323,407 issued Nov. 27, 2001, Ser. No. 09/756,479, filed Jan. 8, 2001, now U.S. Pat. No. 6,403,869 issued Jun. 11, 2002, and application Ser. No. 10/170,005, filed Jun. 10, 2002, now U.S. Pat. No. 6,770, 805.

BACKGROUND OF THE INVENTION

1. Field of the Invention

This invention relates to new and useful improvements in apparatus for carrying percussion instruments, particularly drums of various kinds. Further, the present invention relates to a carrier hardware including a novel support for percussion instruments and to carrier assemblies supporting percussion instruments on a person while standing, walking or marching. In particular, the invention related to a combination of a carrier assembly with a novel receptacle for supporting J-rods thereon.

2. Brief Description of the Prior Art

The prior art discloses many examples of apparatus for supporting percussion instruments but none providing the combination of features disclosed and claimed herein.

La Flame U.S. Pat. No. 5,400,683 discloses a carrier for percussion instruments having an abdominal plate connected at one end of a unitary frame partly encircling the wearer at the waist and having an upstanding rear portion pivotally connected to a back pressure plate. Shoulder bars are connected to the back-pressure plate and wrap about shoulders and support straps connect to the abdominal plate.

Hsieh U.S. Pat. No. 4,799,610 shows a carrier for percussion instruments having a "T" bar, a pair of shoulder bars, a belly plate. The shoulder bars are bolted on a lateral plate of the "T" bar. The lateral plate has arc-like slots and spaced semi-circular holes permit bolts to slide in the slots. The fastening end of each shoulder bar has a hole and an arc-like slot from the upper portion to the lower portion permitting angular adjustment of the shoulder rightward or leftward for various applications.

La Flame U.S. Pat. No. 4,643,032 shows a carrier for various instruments such as marching bells, a marching xylophone or a marching marimba, which are supported on the apparatus by the use of suitably-constructed extension arms. The carrier frame is a U-shaped bent bar welded or otherwise attached to a belly plate and has extension arms, which project from the belly plate to engage and support the instrument.

La Flame GB patent 2,123,676 (based on U.S. Pat. No. 4,453,442) discloses a carrier for percussion instruments or the like which includes the combination of a belly plate with a carrier bracket for supporting an instrument at an outwardly-overhung position about a fulcrum area of contact with the front waistline area of the person, a rigid band with a generally bent contour to extend along a portion of the waistline area of the person to the back of the person, a back-plate riser arm supported by the ban to extend in a generally upward direction such that a portion of the arm will extend along the back thoracic region of the person, and means carried by the arm for imparting to the thoracic back region of the person a reactive force to the overhung weight of the instrument about the aforesaid means forming a fulcrum area of contact with the person.

Dranchak U.S. Pat. No. 4,387,839 discloses a drum-supporting harness having two shoulder-hooks with cushion pads or liners, a breastplate secured to the hooks, and a hanger structure attached to the breast plate and depending therefrom. Upwardly-facing hooks, a spacer bar extending downward from the hooks, and a spacing abutment carried by the spacer bar and extending forward therefrom, are carried by the lower portion of the hanger structure. The hooks and the spacing abutment engage upper and lower portions of the body of the drum. The hanger structure is adjustable or extensible by means of overlapping strips, which can be secured in a number of different positions. An adapter assembly attaches to the upper rim portion of the drum for connecting of hooks 16 to the drum.

Other possibly relevant prior art is Pyle U.S. Pat. No. 5,054,357; May U.S. Pat. No. 5,072,910 and May U.S. Pat. No. 5,300,810.

SUMMARY OF THE INVENTION

One object of the invention is to provide a new and improved carrier for percussion instruments comprising a novel supporting vest and a clamp having polygonal recesses to receive and clamp J-rods or posts around their peripheries in spaced relation on said vest.

Another object of the invention is to provide a new and improved carrier for percussion instruments comprising a novel T-bar carrier with belly plate, shoulder straps, and back bar, and a clamp having polygonal recesses to receive and clamp J-rods or posts around their peripheries in spaced relation on said vest.

Other objects of the invention will become apparent throughout the specification and claims as hereinafter related.

DESCRIPTION OF THE PREFERRED EMBODIMENTS

Figure 1:
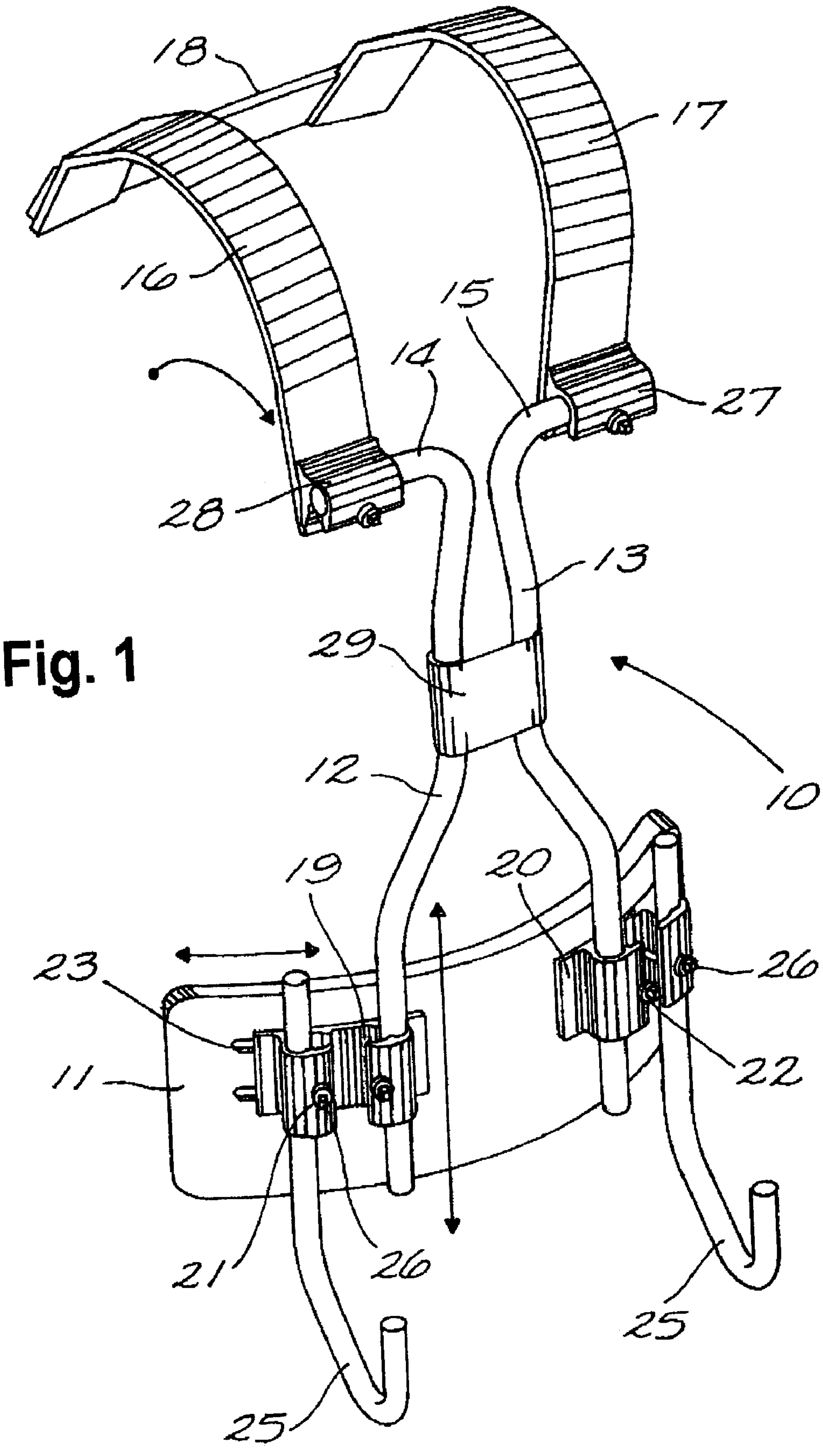
FIG. 1 is a front isometric view of hardware for supporting a drum and having a novel clamping-receptacle for J-rods or tube thereon.

Referring to FIG. 1, there is shown a T-bar-type carrier 10 for percussion instruments which comprises a belly plate 11, vertical supporting rods or tubes 12 and 13 having outturned portions 14 and 15 supporting rigid shoulder straps 16 and 17 and back bar 18. Back bar 18 may be removably secured to shoulder straps 18 or may be fixed as by welding or the like.

Belly plate 11 is removably secured on the lower ends of vertical rods or tubes 12 and 13 by clamping receptacles 19 and 20. J-rod receptacles 21 and 22 are secured on belly plate 11 in slots 23 by screws or bolts or the like. J-rods 25 are secured in receptacles 21 and 22 by bolts 26. The upper, out-turned ends 14 and 15 of supporting rods or tubes 12 and 13 are supported in clamping receptacles 27 and 28 on shoulder straps 16 and 17. A clamp 29 holds rods or tubes 12 and 13 against lateral displacement.

The materials of construction used in this carrier 10 are very important for achieving the desired result. The belly plate 11, vertical supporting rods or tubes 12 and 13, shoulder straps 16 and 17 and back bar 18 are rigid and made of a light material such as plastic or a light metal such as aluminum, magnesium or titanium. The metal shoulder straps have the advantage that different sizes are readily accommodated.

Operation

The operation of this carrier should be apparent but will be described briefly for clarity. The carrier 10 is worn by the musician with the shoulder straps 16 and 17 positioned over the shoulders and the belly plate 11 supported against the abdomen. J-rods 25 are inserted in position and secured in place by tightening bolts 26. The short outer ends of the J-rods 25 are inserted into the J-rod receptacles on the percussion instrument being carried, e.g., drums (single or array), cymbals, xylophone, marimba, or the like.

The carrier is adjustable to comfort the wearer and also to fit different sized instruments. Clamp-receptacles 27 and 28 permit pivotal, lateral and angular adjustment of shoulder straps 16 and 17 on the out-turned ends 14 and 15 of rods or tubes 12 and 13. Clamp-receptacles 19 and 20 permit vertical sliding adjustment of rods or tubes 12 and 13. Slots 23 in belly plate 11 allow lateral adjustment of clamp-receptacles 21 and 22 and angular adjustment of J-rods 25 supported therein.

Another Embodiment

Figure 2:
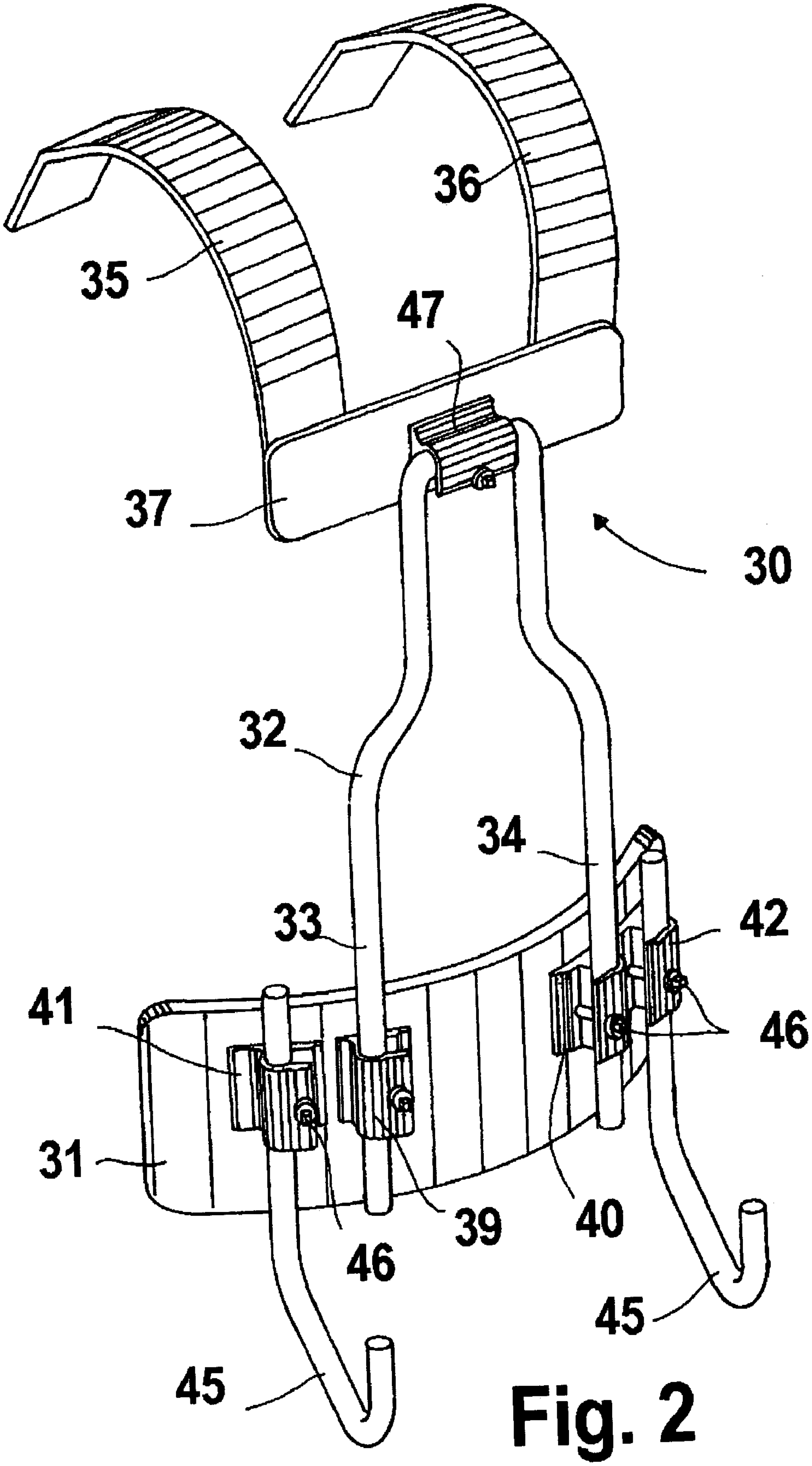
FIG. 2 is a front isometric view of and alternate embodiment drum and J-rod support shown in FIG. 1.
Figure 3:
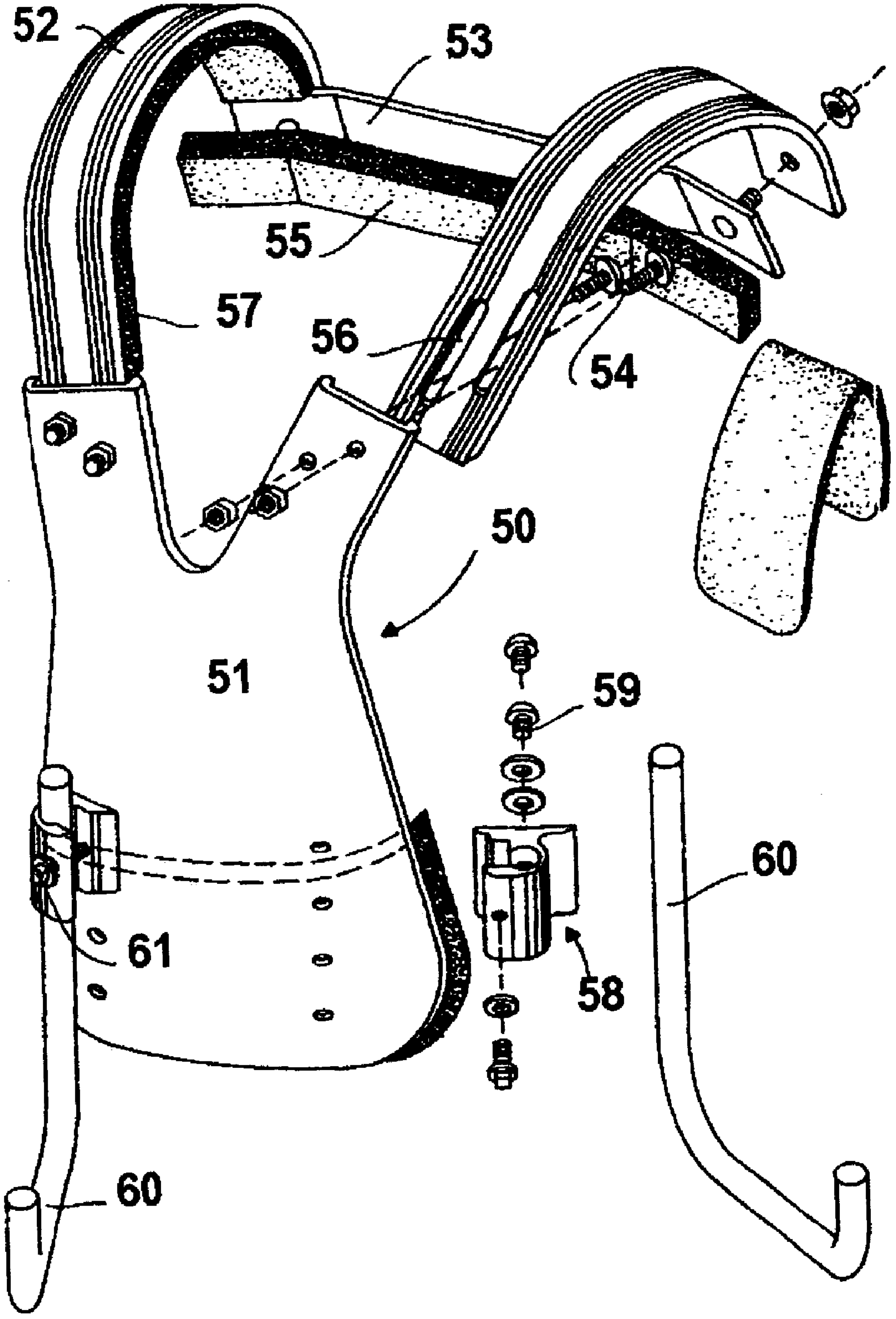
FIG. 3 is a front isometric view of a vest type carrier for supporting a drum and having a novel-clamping receptacle for J-rods or tube thereon.
Figure 4:
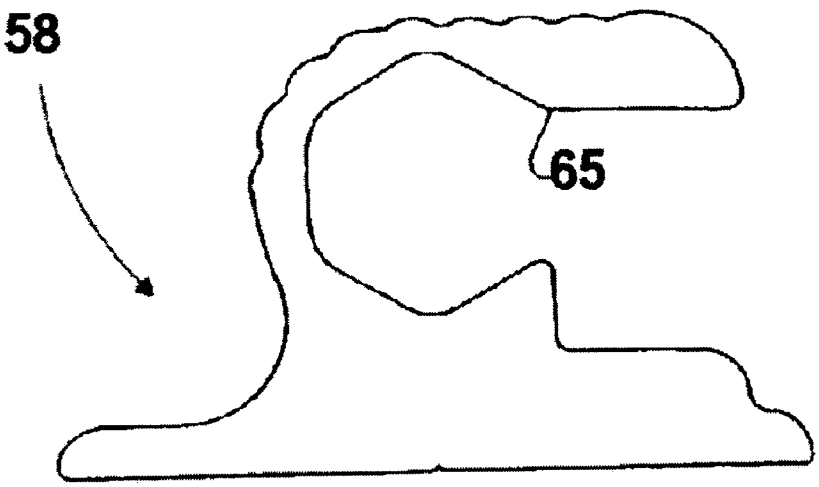
FIG. 4 is an end view and FIGS. 5–6 are left and right isometric views of the adjustable clamping receptacles for J-rods shown in FIGS. 1–3.
Figure 5:
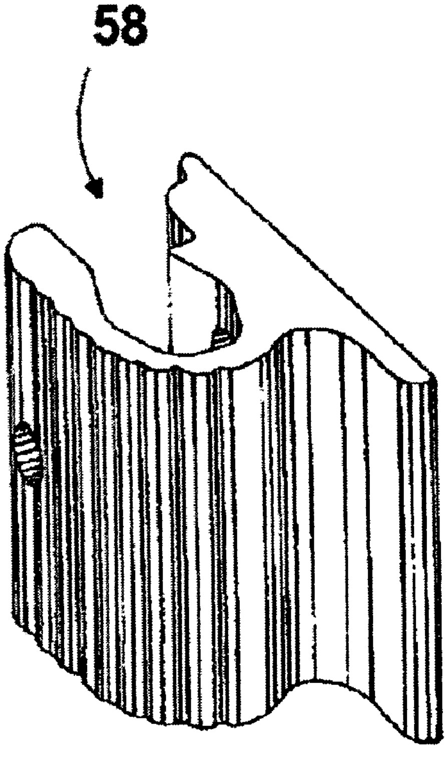
Figure 6:
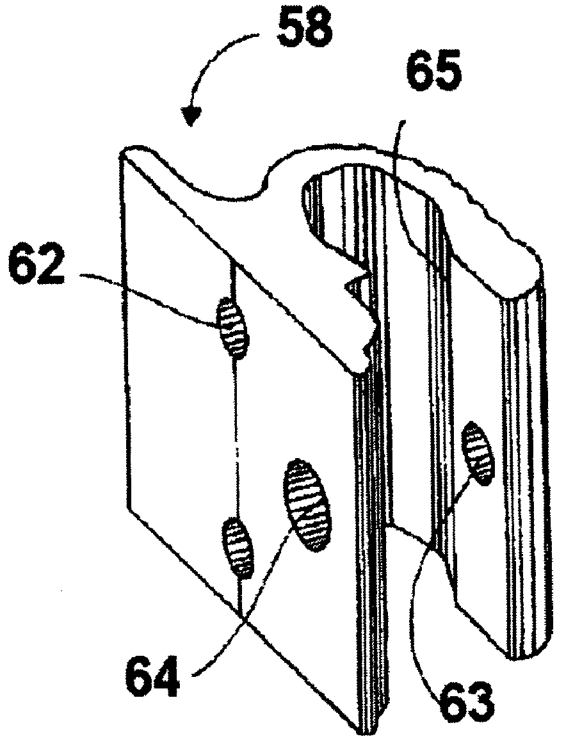

Referring to FIG. 2, there is shown a T-bar-type carrier 30 for percussion instruments, which comprises a belly plate 31, an inverted U-shaped vertical supporting rod or tube 32. Rod or tube 32 has parallel portions 33 and 34 supporting belly plate 31. Rigid shoulder straps 35 and 36 are secured on bar 37.

Belly plate 31 is removably secured on the lower ends 33 and 34 of vertical rod or tube 32 by clamping receptacles 39 and 40. J-rod receptacles 41 and 42 are secured on belly plate 31. J-rods 45 are secured in receptacles 41 and 42 by bolts 46. The upper U-portion of supporting rod or tube 32 is supported in clamping receptacle 47 on bar 37 to support shoulder straps 35 and 36.

The materials of construction used in this carrier 30 are very important for achieving the desired result. The belly plate 31, supporting rod or tube 32, and shoulder straps 35 and 36 are made of a light material such as plastic or a light metal such as aluminum, magnesium or titanium.

Operation

The operation of this carrier should be apparent but will be described briefly for clarity. The carrier 30 is worn by the musician with the shoulder straps 35 and 36 positioned over the shoulders and the belly plate 31 supported against the abdomen. J-rods 45 are inserted in position and secured in place by tightening bolts 46. The short outer ends of the J-rods 45 are inserted into the J-rod receptacles on the percussion instrument being carried, e.g., drums (single or array), cymbals, xylophone, marimba, or the like. The carrier is adjustable to comfort the wearer and also to fit different sized instruments.

Clamp-receptacle 47 permits pivotal adjustment of shoulder straps 35 and 36. Clamp-receptacles 39 and 40 permit vertical sliding adjustment of rod or tube 32. Clamp-receptacles 41 and 42 permit angular adjustment of J-rods 65.

A Further Embodiment

Referring to FIGS. 3–6, there is shown a vest- or harness-type carrier 50 for percussion instruments, which comprises a vest portion 51, shoulder straps 52 and back bar 53. Back bar 53 is removably secured to shoulder straps 52 by screws or bolts and (optionally) has padding 55.

Vest portion 51 is adjustably and removably secured to shoulder straps 52 by screws or bolts 54 which extend through elongated slots 56 which permits adjustment of the straps 52 relative to vest portion 51. Shoulder straps 52 (optionally) have pads 57 to cushion the load of the instruments carried by carrier 50.

Vest portion 51 has a pair of J-rod receptacles 58 secured by screws or bolts 59. J-rods 60 are supported in receptacles 58 and secured in position by square head bolts 61, which may be operated by a drum key (not shown). Receptacles 58 are cast or extruded and have an open edge portion 65 (FIG. 6), which can flex to clamp J-rods 60 adjustably.

Receptacles 58 have an inner surface that is polygonal, in this case, hexagonal, in section, which provides a plurality of surfaces, which clamp the surface of the J-rods 60. This is a superior clamping arrangement to set screws that provide only one or two point clamping contact. Holes 62 (FIG. 6) in the base of each receptacle 58 are used for mounting by means of bolts or screws or the like. Aligned holes 63, 64 receive clamping screws 61 which operate on adjustment to clamp or to release the J-rod 60.

The materials of construction used in this carrier 50 are very important for achieving the desired result. The vest portion 51 is preferably a strong, light-weight composite material such as Fiberglas®. Back bar 53 and shoulder straps 52 are rigid and made of a light metal such as aluminum, magnesium or titanium. Some prior art vests of this type have been of a one-piece Fiberglas® construction. There were incidents of failure of the shoulder straps from repeated flexing.

The metal shoulder straps do not fail in flexure and also have the advantage that different sizes are readily accommodated. The vest portion 51 can be of a single size and separate shoulder straps 53 of differing radii for small, medium, large or extra large size may be used or the straps 53 may be adjustable is in the additional embodiments described below.

Operation

The operation of this carrier should be apparent but will be described briefly for clarity. The carrier 50 is worn by the musician with the shoulder straps 52 positioned over the shoulders and the vest 51 supported against his abdomen. The straps 52 are adjustable by means of slots 56 and screws 54 and the J-rods 60 are adjustable in position by means of receptacles 58 and adjustment screws 61.

Vest 51 may have suitable padding over its inner surface, as needed, at the belly plate or at suitable locations to avoid discomfort from the bolts or screws 54 used to assemble the straps to the vest or bolts or screws 59 used to assemble receptacles 58 on the vest. J-rods 60 are inserted in position and secured in place by tightening screws 61. The short outer ends of the J-rods are inserted into the J-rod receptacles on the percussion instrument being carried, e.g., drums (single or array), cymbals, xylophone, marimba, or the like.

Double Facing J-Rod Receptacles and Application

Figure 7:
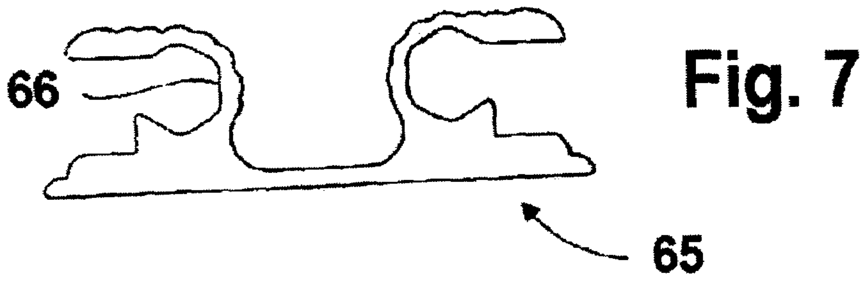
FIG. 7 is a view in end elevation of a novel double clamp for supporting a plurality of posts and/or J-rods.
Figure 8:
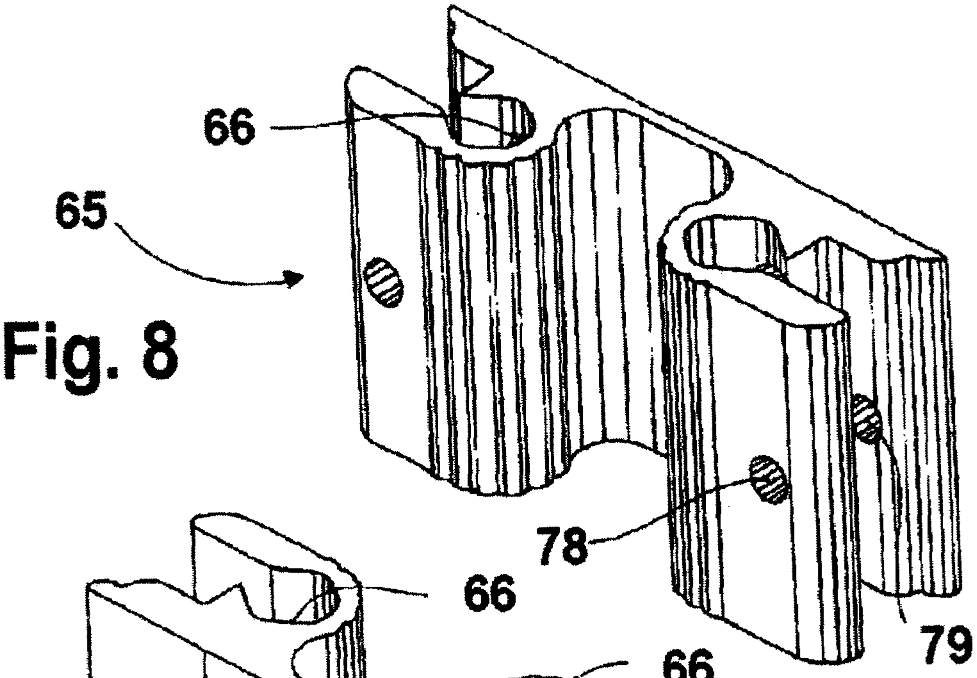
FIG. 8 is a front isometric view of the clamp shown in FIG. 7.
Figure 9:
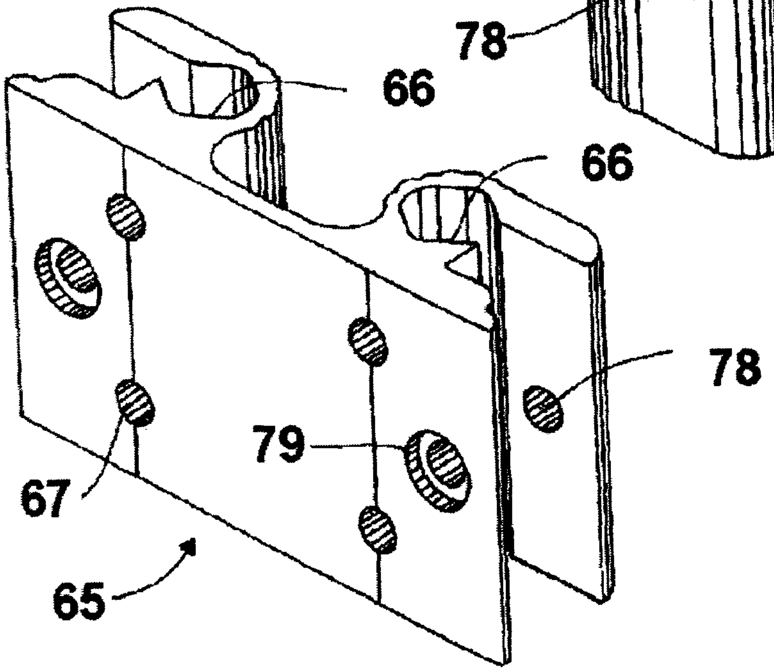
FIG. 9 is a rear isometric view of the clamp shown in FIG. 7.

In FIGS. 7–9 there is shown a double facing receptacle for securing more than one J-rod or post. Receptacle 65 is cast or extruded and has a pair of open edge portions 66 facing in opposite directions which can flex to clamp J-rods or posts adjustably. Receptacles 65 have inner surfaces that are polygonal in section, which provides a plurality of surfaces, which clamp the surface of the J-rods or posts.

This is a superior clamping arrangement to set screws that provide only one or two point clamping contact. Holes 67 in the base of each receptacle are used for mounting by means of bolts or screws or the like. Aligned holes 78, 79 receive clamping screws, which operate on adjustment to clamp, or to release the J-rod or post secured therein.

Embodiment with Adjustably Positioned J-Rod Clamps

Figure 11:
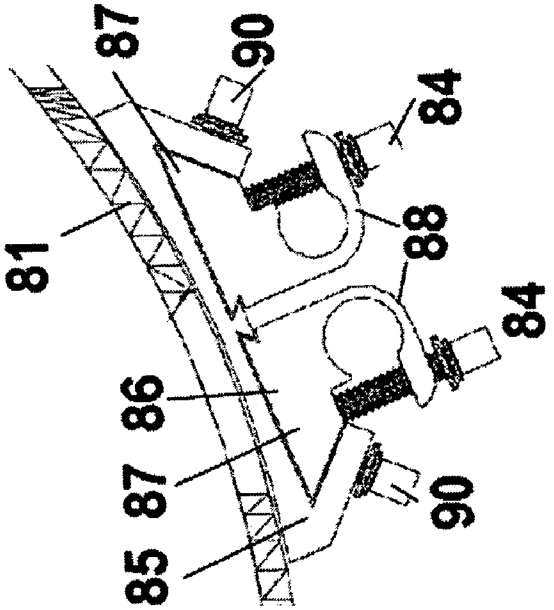
FIG. 11 is an end view of the clamp shown in FIG. 10.
Figure 10:
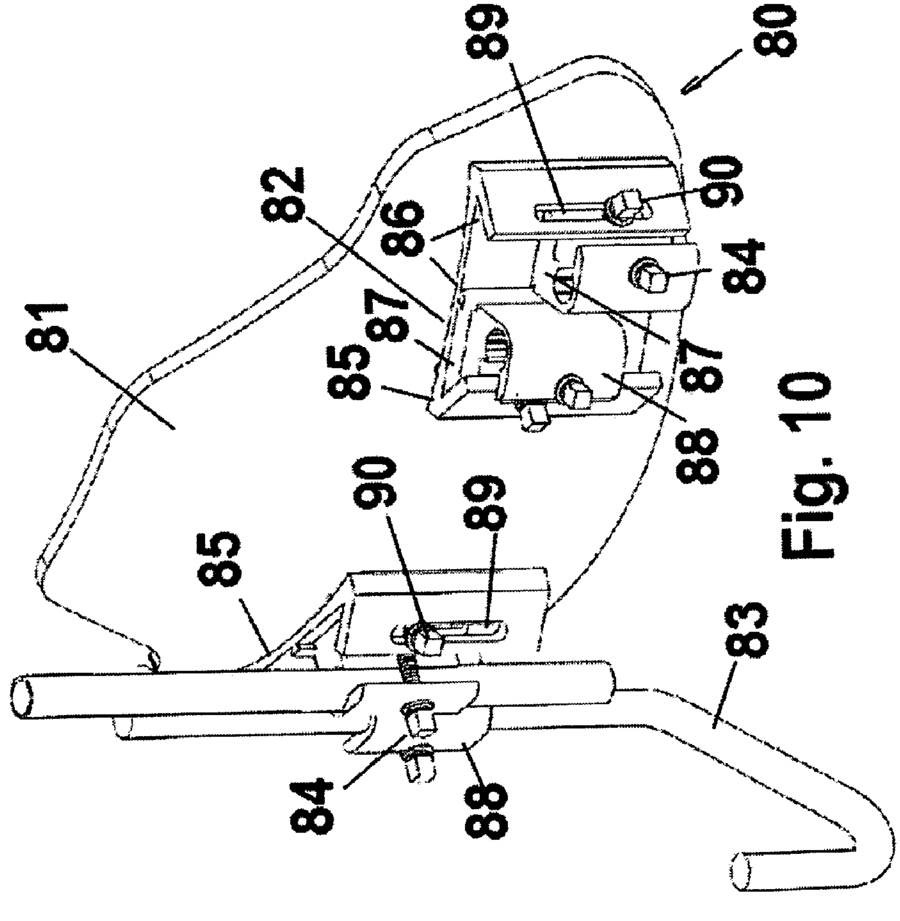
FIG. 10 is a front isometric view of the fully assembled carrier and supporting clamp of FIGS. 4–6 with J-rods positioned in a normal position for supporting the drum and having a dovetail supporting base permitting adjustment in position of the clamp.

Referring to FIGS. 10–11, there is shown a vest- or T-bar-type carrier 80 for percussion instruments which comprises a vest portion or belly plate portion 81 having two pairs of J-rod receptacles 82 secured by screws or bolts. J-rods 83 are supported in receptacles 82 and secured in position by square head bolts 84, which may be operated by a drum key (not shown).

Receptacles 82 are cast or extruded and have an open edge portion 88, which can flex to clamp J-rods 83 adjustably. Receptacles 82 have an inner surface that is non-circular, e.g., polygonal, serrated, or the like, which provides a plurality of surfaces, which clamp the surface of the J-rods 83. This is a superior clamping arrangement to set screws that provide only one or two point clamping contact.

Supporting base members 85 are secured on vest or belly plate 81, having dovetailed recesses 86 for slidably supporting receptacles 82 and slots 89. The receptacles 82 have a base portion 87 shaped to fit the dovetail recesses 86 for slidable movement therein. Aligned holes in receptacles. 82 receive square headed bolts 84, which are operated by a drum key to clamp or to release the J-rod 83. Square headed bolts 90 extend through slots 89 into receptacle base portions 87 and are operated by a drum key to clamp or to release the receptacles in position.

Operation

The operation of this carrier should be apparent but will be described briefly for clarity. The carrier 80 is worn by the musician with the vest or belly plate 81 supported against his abdomen. Receptacle bases 85 are secured on vest or belly plate 81 and support receptacles 82 for sliding movement in dovetail recesses 86. Square-headed bolts 90 secure the receptacles in bases 85 for longitudinal adjustment of position therein. Square-headed bolts 84 are operated to clamp receptacles 82 around J-rods or tubes 83.

Another Embodiment with Adjustably Positioned J-Rod Clamps

Figure 13:
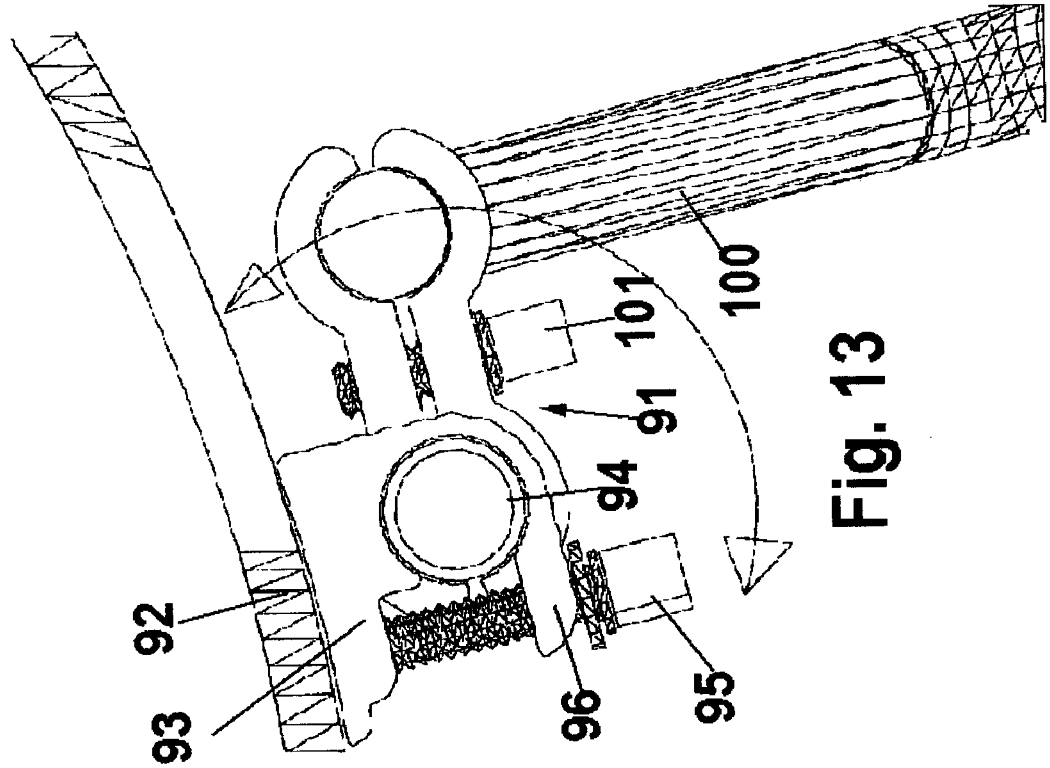
FIG. 13 is an end view of the clamp shown in FIG. 12.
Figure 12:
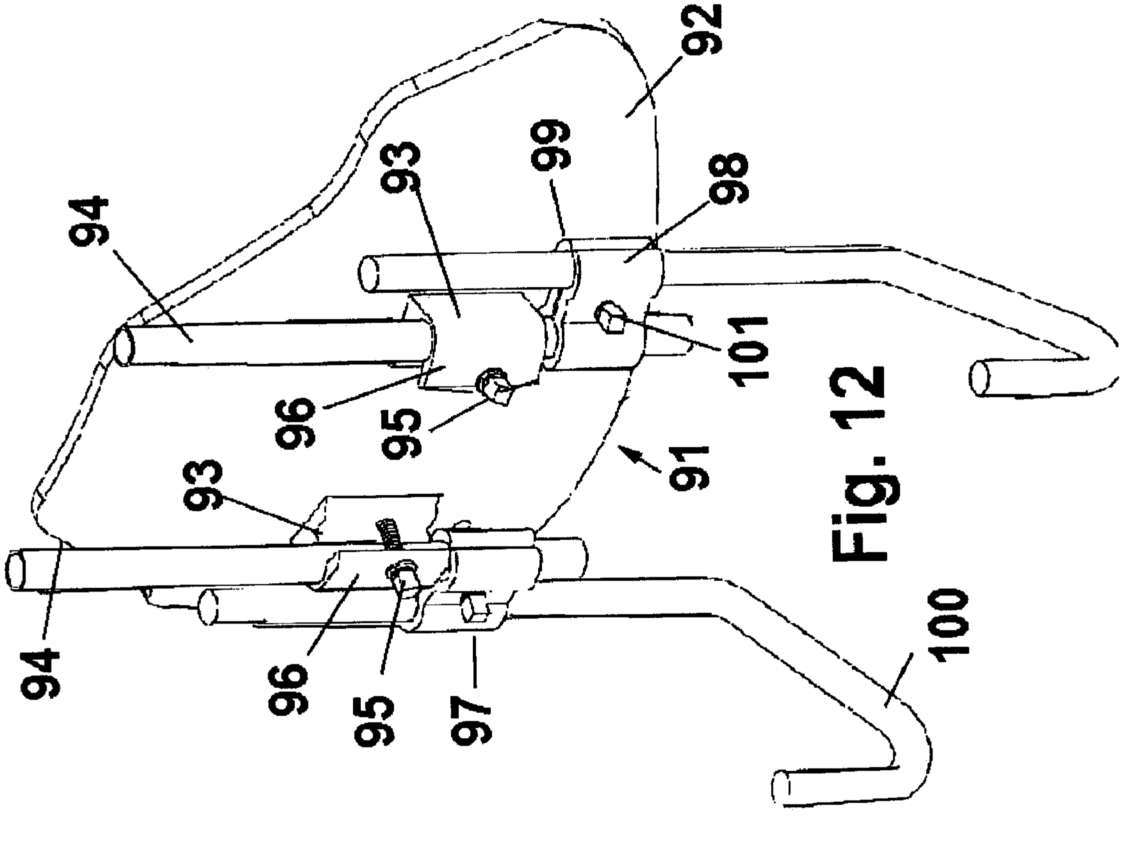
FIG. 12 is a front isometric view of the fully assembled carrier and supporting clamp of FIGS. 4–6 with J-rods positioned in a normal position for supporting the drum and having a double clamp for the supporting base permitting longitudinal and rotary adjustment in position of the clamp.

Referring to FIGS. 12–13, there is shown a vest- or T-bar-type carrier 91 for percussion instruments, which comprises a vest portion or belly plate portion 92 having two pairs of receptacles 93 secured thereon by screws or bolts. Supporting tubes 94 are supported in receptacles 93 and secured in position by square head bolts 95, which may be operated by a drum key (not shown).

Receptacles 93 are cast or extruded and have an open edge portion 96, which can flex to clamp tubes 94 adjustably Receptacles 93 have an inner surface that is non-circular, e.g., polygonal, serrated, or the like, which provides a plurality of surfaces, which clamp the surface of the tubes 94. This is a superior clamping arrangement to set screws that provide only one or two point clamping contact.

Two part tube clamps 97 have mating portions 98 and 99 secured together to clamp tube 94 and J-rods 100. Aligned holes in mating portions 98 and 99 receive square headed bolts 101, which are operated by a drum key to clamp or to release the tube 94 and J-rod 100.

Operation

The operation of this carrier should be apparent but will be described briefly for clarity. The carrier 91 is worn by the musician with the vest or belly plate 92 supported against his abdomen. Receptacle bases 93 are secured on vest or belly plate 92. Square-headed bolts 95 secure supporting tubes 94 for longitudinal adjustment of position therein. Square-headed bolts 101 are operated to clamp two part clamp 97 around J-rod 100 or tube 94. This construction permits independent vertical adjustment of J-rod 100 and rotary movement of the J-rod on supporting tube 94.

Another Embodiment with Adjustably Positioned J-Rod Clamps

Figures 14, 15:
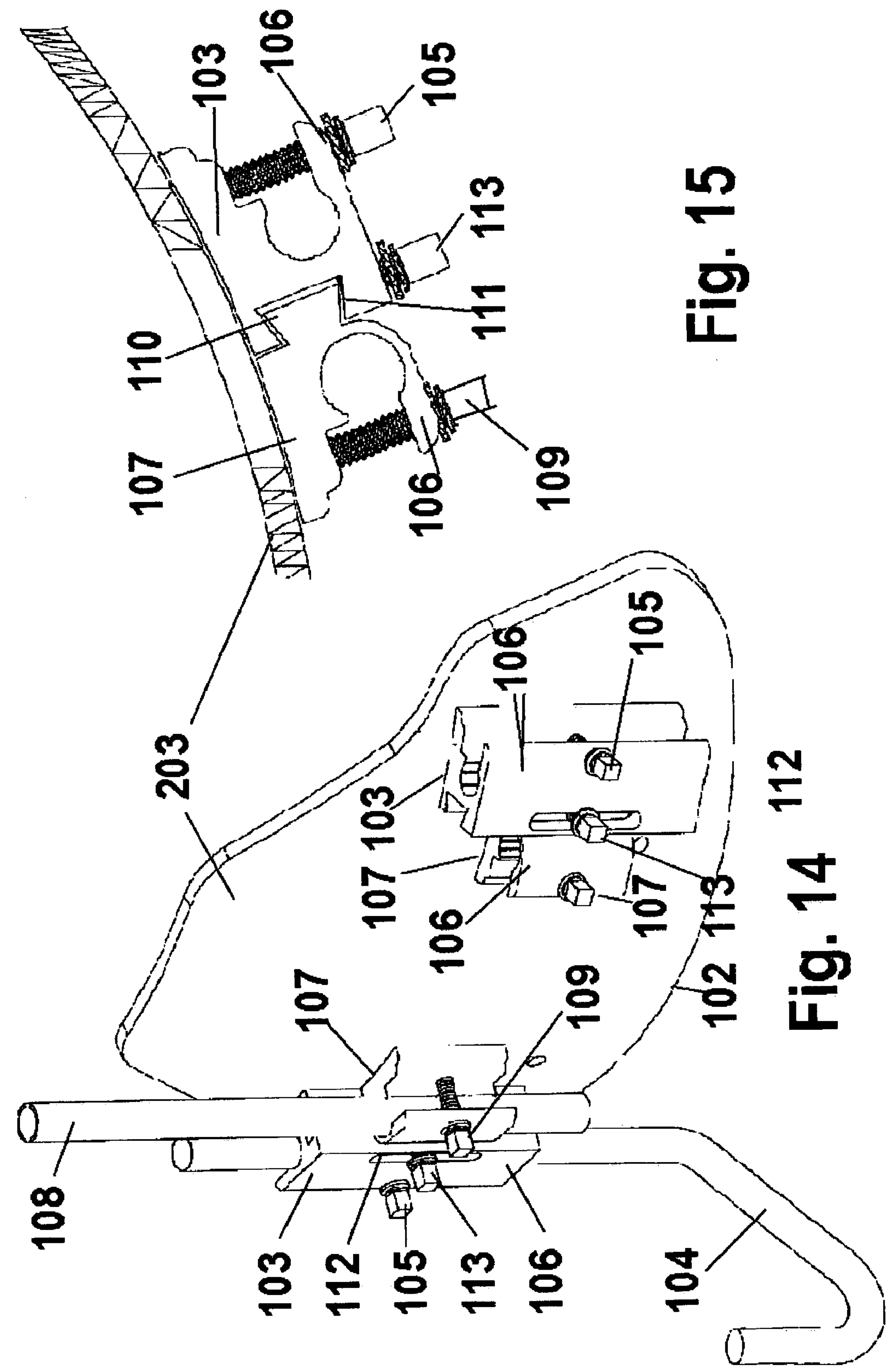
FIG. 14 is a front isometric view of the fully assembled carrier and supporting clamp of FIGS. 4–6 with J-rods positioned in a normal position for supporting the drum and having a side to side dovetail support for the base permitting adjustment in position of the clamp.
FIG. 15 is an end view of the clamp shown in FIG. 14.

Referring to FIGS. 14–15, there is shown a vest- or T-bar-type carrier 102 for percussion instruments, which comprises a vest portion or belly plate portion 203 having a pair of J-rod receptacles 103. J-rods 104 are supported in receptacles 103 and secured in position by square head bolts 105, which may be operated by a drum key (not shown).

Receptacles 103 are cast or extruded and have an open edge portion 106, which can flex to clamp J-rods 104 adjustably. Receptacles 103 have an inner surface that is non-circular, e.g., polygonal, serrated, or the like, which provides a plurality of surfaces, which clamp the surface of the J-rods 104. This is a superior clamping arrangement to set screws that provide only one or two point clamping contact.

Receptacles 107 receive and support tubes 108 secured in position by square head bolts 109, which may be operated by a drum key (not shown). A dovetailed rib 110 on receptacle 107 fits in a dovetailed recess 111 in receptacle 103 for sliding movement therein. Receptacle 103 has slot 112, which receives a square head bolt 113 operated by a drum key to tighten the dovetailed connection and fix the receptacles 103 and 107 in a selected position.

Operation

The operation of this carrier should be apparent but will be described briefly for clarity. The carrier 102 is worn by the musician, with the vest or belly plate 203 supported against his abdomen. Receptacles 103 are secured on vest or belly plate 203 and support receptacles 107 for sliding movement in the dovetailed connection. Square-headed bolts 113 secure the receptacles 103 and 107 for longitudinal adjustment of position therein. Square-headed bolts 105 are operated to clamp receptacles 103 around J-rods 104.

Another Embodiment with Adjustably Positioned J-Rod Clamps

Figure 17:
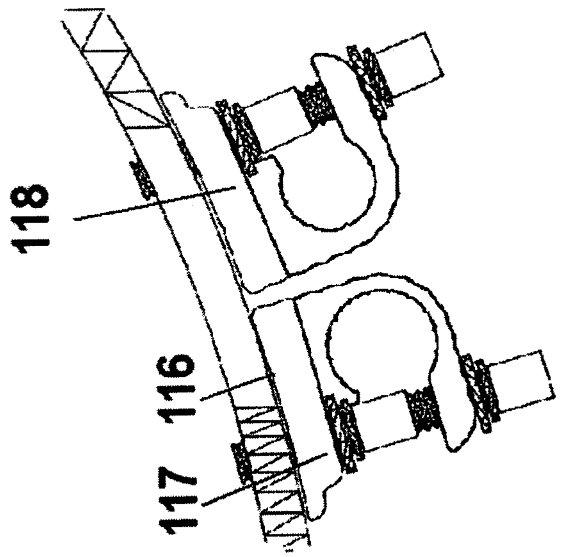
FIG. 17 is an end view of the clamp shown in FIG. 16.
Figure 16:
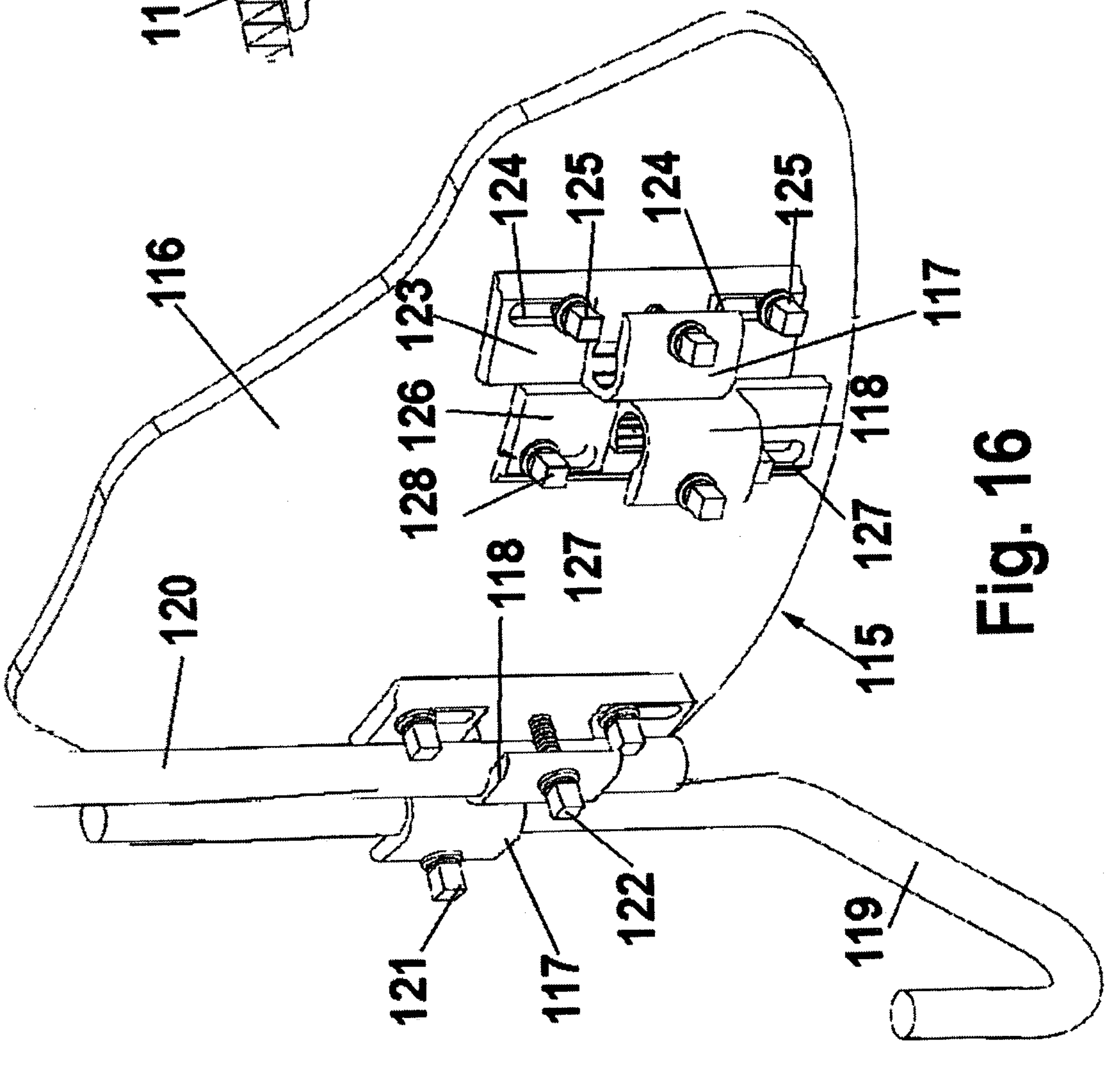
FIG. 16 is a front isometric view of the fully assembled carrier and supporting clamp of FIGS. 4–6 with J-rods positioned in a normal position for supporting the drum and having a slotted support for the base permitting adjustment in position of the clamp.

Referring to FIGS. 16–17, there is shown a vest- or T-bar-type carrier 115 for percussion instruments, which comprises a vest portion or belly plate portion 116 having a pair of J-rod receptacles 117 and a pair of tube receptacles 118. J-rods 119 are supported in receptacles 117 and tubes 120 are supported in receptacles 118. Square head bolts 121 in receptacles 117 and square head bolts 122 in receptacles 118 are operated by a drum key (not shown) as in the other embodiments to clamp the J-rods 119 and tubes 120 in place.

Receptacles 117 and 118 are cast or extruded and have an open edge portion which can flex to clamp J-rods or tubes adjustably. Receptacles 117 and 118 have an inner surface that is non-circular, e.g., polygonal, serrated, or the like, which provides a plurality of surfaces, which clamp the surface of the J-rods or tubes. This is a superior clamping arrangement to set screws that provide only one or two point clamping contact.

Receptacles 117 have base portions 123 and slots 124 for mounting to the belly plate 116. Receptacles 117 are secured in position by square head bolts 125, which may be operated by a drum key (not shown). Receptacles 118 have base portions 126 and slots 127 for mounting to the belly plate 116. Receptacles 118 are secured in position by square head bolts 128, which may be operated by a drum key (not shown).

Operation

The operation of this carrier should be apparent but will be described briefly for clarity. The carrier 115 is worn by the musician, with the vest or belly plate 116 supported against his abdomen. Receptacles 117 and 118 are secured on vest or belly plate 116. Square-headed bolts 125 and 128 secure the receptacles 117 and 118 for longitudinal adjustment of position therein. Square-headed bolts 121 and 122 are operated to clamp receptacles 117 and 118 around J-rods 119 and tubes 120.

While this invention has been described fully and completely, with special emphasis on several preferred embodiments and/or applications, it should be understood that within the scope of the appended claims, the invention may be practiced otherwise than as specifically described.

The invention claimed is:

1. A shoulder supported harness assembly for supporting percussion instruments, comprising
- a supporting member positioned to rest against the abdominal region of the wearer in use,
- a pair of rigid shoulder straps supporting said supporting member,
- at least one receptacle secured on said supporting member,
- drum supporting hardware operatively supported on said supporting member comprising a rod or tube supported in said receptacles,
- said receptacle comprising a flat base portion and a bracket upper portion overlying said base portion defining an opening permitting said upper portion to flex toward said base portion,
- said opening being configured to clamp said rod or tube therein at a plurality of points, and
- means for tightening said bracket upper portion to clamp on a rod positioned therein.

2. A shoulder supported harness assembly for supporting percussion instruments according to claim 1, in which:
- said rod or tube supported in said receptacle is a J-rod for supporting percussion hardware.

3. A shoulder supported harness assembly for supporting percussion instruments according to claim 1, in which:
- said receptacle opening is polygonal in cross-section.

4. A shoulder supported harness assembly for supporting percussion instruments according to claim 1, including:
- a plurality of separate clamping receptacles supported on said supporting member,
- supporting tubes or rods connected in said clamping receptacles on said supporting member for adjustment and/or removal.

5. A shoulder supported harness assembly for supporting percussion instruments according to claim 1, including:
- a plurality of clamping receptacles combined on a single base supported on said supporting member,
- supporting tubes or rods connected in said clamping receptacles on said supporting member for adjustment and/or removal.

6. A shoulder supported harness assembly for supporting percussion instruments according to claim 1, including:
- a plurality of clamping receptacles combined on a single base supported on said supporting member,
- said receptacles being of a one-piece construction comprising a flat base portion and at least two upper portions overlying said base portion defining openings permitting said upper portions to flex toward said base portion,
- said opening beings configured to clamp said rod or tube therein at a plurality of points, and
- means for tightening said receptacle upper portions to clamp on rods or tubes positioned therein.

7. A shoulder supported harness assembly for supporting percussion instruments according to claim 6, in which:

said opening are positioned to the outside of said receptacles.

8. A shoulder supported harness assembly for supporting percussion instruments according to claim 6, in which:

said opening are positioned to the inside of said receptacles.

9. A shoulder supported harness assembly for supporting percussion instruments according to claim 1, including:

a plurality of separate clamping receptacles each on a single base supported on said supporting member, each said receptacle being of a one-piece construction comprising a flat base portion and an upper portion overlying said base portion defining an opening permitting said upper portion to flex toward said base portion, said opening beings configured to clamp said rod or tube therein at a plurality of points, and means for tightening said receptacle upper portion to clamp on rods or tubes positioned therein.

10. A shoulder supported harness assembly for supporting percussion instruments according to claim 1, in which:

said supporting member is a belly plate, said clamping receptacles on said belly plate are positioned vertically thereon, one of said tubes or rods being of a U-shape and having outturned ends fitting in shoulder strap clamping receptacles permitting adjustment of pivotal, angular, or lateral position on said shoulder straps, another of said tubes or rods being of a U-shape having spaced ends fitting in said belly plate clamping receptacles permitting vertical positioning on said belly plate, and a clamp member securing said U-shaped tubes or rods together in a fixed but pivotally adjustable relation.

11. A shoulder supported harness assembly for supporting percussion instruments according to claim 1, in which:

said supporting member is a vest of light rigid material, and clamping receptacles on said vest.

12. A shoulder supported harness assembly for supporting percussion instruments according to claim 1, in which:

said receptacle opening is polygonal in cross section to permit clamping said rod by each of the flat polygonal surfaces, screw means for connecting said receptacles to a supporting surface, and screw means for tightening said bracket upper portion to clamp on said rod positioned therein.

13. A shoulder supported harness assembly for supporting percussion instruments according to claim 1, including:

a plurality of separate clamping receptacles supported on said supporting member, means supporting a pair of said receptacles movement relative to each other, and tubes or rods supported in said clamping receptacles on said supporting member for adjustment and/or removal.

14. A shoulder supported harness assembly for supporting percussion instruments according to claim 13, in which:

said receptacle supporting means comprises a base with dovetailed recesses therein, and said receptacles having bases dovetailed in shape to fit said base dovetailed recesses for sliding movement therein.

15. A shoulder supported harness assembly for supporting percussion instruments according to claim 13, in which:

said receptacle supporting means comprises a base with two dovetailed recesses therein, said receptacles having bases dovetailed in shape to fit said base dovetailed recesses for sliding movement therein, and means for clamping said receptacles at selected positions in said supporting base.

16. A shoulder supported harness assembly for supporting percussion instruments according to claim 1, including:

a plurality of separate clamping receptacles supported on said supporting member, supporting rods or tubes secured in each of said clamping receptacles, J-rods to be supported on said supporting member, and clamping means securing said J-rods to said supporting tubes or rods.

17. A shoulder supported harness assembly for supporting percussion instruments according to claim 16, in which:

said clamping means securing said J-rods to said supporting tubes or rods comprises a two part clamp, each part of which has shaped to fit together in clamping relation.

18. A shoulder supported harness assembly for supporting percussion instruments according to claim 1, including:

a plurality of separate clamping receptacles supported on said supporting member, supporting rods or tubes secured in first named selected clamping receptacles, J-rods to be supported in second named clamping receptacles, said first named and said second named receptacles having side walls with a dovetailed connection comprising a dovetailed rib on one and a dovetailed recess on the other for sliding movement of one relative to the other.

19. A shoulder supported harness assembly for supporting percussion instruments according to claim 18, in which:

a plurality of separate clamping receptacles supported on said supporting member, first named selected clamping receptacles being secured directly to said supporting member, second named selected receptacles having a dovetailed connection to said first named selected clamping receptacles comprising a dovetailed rib on one and a dovetailed recess on the other for sliding movement of one relative to the other.

20. A shoulder supported harness assembly for supporting percussion instruments according to claim 19, including:

means for clamping said dovetailed connection of said receptacles to maintain selected positions relative to said supporting base.

21. A shoulder supported harness assembly for supporting percussion instruments according to claim 1, including:

a plurality of separate clamping receptacles supported on said supporting member, tubes or rods supported in said clamping receptacles on said supporting member for adjustment and/or removal, each of said receptacles being secured on said supporting member by a slotted connection permitting movement of one receptacle relative to another.

22. A shoulder supported harness assembly for supporting percussion instruments according to claim 21, in which:

each of said receptacles has an elongated base portion with slots therein and being secured on said supporting member by a bolts extending through said slots into said supporting member to form slotted connections permitting movement of one receptacle relative to another.

23. A receptacle for supporting rods or tubes on a supporting harness for percussion instruments, comprising:

a flat base portion, an upper portion overlying said base portion defining an opening permitting said upper portion to flex toward said base portion, said opening having a configuration in cross section to permit clamping a rod or tube at a plurality of points, means for connecting said receptacle base portion to a supporting surface, and means for tightening said receptacle upper portion to clamp on a rod or tube positioned therein.

24. A receptacle for supporting rods or tubes on a supporting harness for percussion instruments, comprising:

a flat base portion, an upper portion overlying said base portion defining an opening permitting said upper portion to flex toward said base portion, said opening having a configuration in cross section to permit clamping a rod or tube at a plurality of points, said receptacle opening is polygonal in cross section to permit clamping a rod or tube on each of the flat polygonal surfaces, screw means for connecting said receptacle base portion to a supporting surface, and screw means for tightening said bracket upper portion to clamp on a rod or tube positioned therein.

25. A receptacle for supporting rods or tubes on a supporting harness for percussion instruments, comprising: a flat base portion, an upper portion overlying said base portion defining an opening permitting said upper portion to flex toward the base portion; said opening having a configuration in cross section to permit clamping rod or tube at a plurality of points, means for connecting the receptacle base portion to a supporting surface, means for tightening said receptacle upper portion to clamp on a rod or tube positioned therein, said receptacle comprises a double facing receptacle for securing mars than one rod or tube, having an elongated base portion, a pair of open edge portions facing in opposite directions, outwardly or inwardly, which can flex to clamp rods or tubes adjustably, an upper portion overlying said base portion defining openings permitting said upper portion to flex toward said base portion, said opening having a configuration in cross section to permit clamping a rod or tube at a plurality of points, means for connecting said receptacle base portion to a supporting surface, and means for tightening said receptacle, upper portion to clamp on a rod or tube positioned therein.

26. A receptacle for supporting rods or tubes on a supporting harness for percussion instruments a, plurality of separate clamping receptacles supported on a supporting member; supporting rods or tubes to be secured in at least one receptacle, said receptacle assembly comprises a base with two dovetailed recesses therein, said receptacles having bases dovetailed in shape to fit said base dovetailed recesses for sliding movement therein, and means for clamping said receptacles at selected positions in said supporting base.

27. A receptacle assembly for supporting rods or tubes on a supporting harness for percussion instruments, comprising a plurality of separate clamping receptacles supported on a supporting member, supporting rods or tubes to be secured in one clamping receptacles, J-rods to be supported in other clamping receptacles, and said one and said other receptacles having side walls with a dovetailed connection comprising a dovetailed rib on one and a dovetailed recess on the other for sliding movement of one relative to the other.

* * * * *